(12) United States Patent
Eriksson

(10) Patent No.: US 6,343,566 B1
(45) Date of Patent: Feb. 5, 2002

(54) TEAT CLEANING BRUSH

(75) Inventor: Jan Eriksson, Uttran (SE)

(73) Assignee: DeLaval Holding AB, Tumba (SE)

(*) Notice: Subject to any disclaimer, the term of this patent is extended or adjusted under 35 U.S.C. 154(b) by 0 days.

(21) Appl. No.: 09/555,772

(22) PCT Filed: Dec. 1, 1998

(86) PCT No.: PCT/SE98/02197

§ 371 Date: Jun. 5, 2000

§ 102(e) Date: Jun. 5, 2000

(87) PCT Pub. No.: WO99/27773

PCT Pub. Date: Jun. 10, 1999

(30) Foreign Application Priority Data

Dec. 4, 1997 (SE) .............................. 9704517

(51) Int. Cl.$^7$ ............................ A01J 5/02; A01K 29/00
(52) U.S. Cl. ................ 119/14.01; 119/664; 119/14.18; 119/608
(58) Field of Search ............................ 119/14.01, 14.18, 119/608, 609, 664; 15/21.1, 23, 363; D4/128, 102

(56) References Cited

U.S. PATENT DOCUMENTS

| 4,293,584 A | * 10/1981 | Clayton ..................... 427/11 |
| 5,211,132 A | 5/1993 | Farina et al. ............... 119/158 |
| 5,235,937 A | * 8/1993 | Farina et al. ............... 119/158 |
| 5,383,423 A | * 1/1995 | van der Lely ............. 119/158 |
| 5,673,650 A | * 10/1997 | Mottram et al. ............ 119/651 |
| 6,155,204 A | * 12/2000 | van der Lely et al. .... 119/14.02 |

FOREIGN PATENT DOCUMENTS

| DE | 1 27 384 | 9/1977 | ............. A01J/5/00 |
| EP | 0 476 771 | 3/1992 | ......... A01K/13/00 |
| FR | 2 559 351 A1 | * 2/1984 | ......... A01K/13/00 |
| SU | 1402305 | 6/1988 | ............. A01J/7/00 |

* cited by examiner

Primary Examiner—Charles T. Jordan
Assistant Examiner—Kimberly S Smith
(74) Attorney, Agent, or Firm—Young & Thompson

(57) ABSTRACT

A teat cleaning device (1) contains a number of rotatable cleaning brushes (11) which have a spiral or helical cleaning surface (17).

9 Claims, 3 Drawing Sheets

TEAT CLEANING BRUSH

CROSS REFERENCE TO RELATED APPLICATIONS

This application is the National Stage entry under 35 U.S.C. 371 of International application PCT/SE98/02197 filed on Dec. 1, 1998.

FIELD OF THE INVENTION

The present invention relates to an apparatus according to the preamble of claim 1 for cleaning the teats of animal.

BACKGROUND OF THE INVENTION

A problem when milking dairy animals is how to ensure that the teats of the animal are clean before milking commences. As manual teat cleaning is labour-intensive, inefficient and time consuming various machines for cleaning teats have been proposed.

The German patent DE 127 384 describes a device with a plurality of elongated brushes mounted vertically on a holder. The brushes can rotate about their vertical central axis and have horizontally projecting bristles which can brush the surface of any teats introduced vertically down between the brushes. As the teat advances downwards the bristles are pushed down and away from the tip of the teat. A problem with this device is that when the teat is fed down between the brushes it its downward movement is resisted by the bristles and the teat is axially compressed. This causes skin folds or increases the depth of the skin folds already present and lead to inadequate cleaning of the teat.

OBJECT OF THE INVENTION

An object of the present invention is to overcome the problems of the prior art teat cleaning devices. These problems are overcome by a teat cleaning device having the features mentioned in the characterising portion of claim 1.

SUMMARY OF THE INVENTION

In the present invention the vertically mounted rotatable brushes are provided with a cleaning surface which is arranged in a spiral or helical shape.

By a suitable choice of the direction of the spiral surface and the direction of rotation of the cleaning brushes, as the teat is introduced into the device the rotating brushes can be made to grip the teat and drag it downwards. This stretches the skin of the teat thereby reducing or eliminating the skin folds and allowing the cleaning surface to clean substantially the whole of the surface of the teat.

BRIEF DESCRIPTION OF THE DRAWINGS

The invention will be described more closely with the help of examples of embodiments and the appended figures in which.

DETAILED DESCRIPTION OF THE INVENTION

Figure 1:
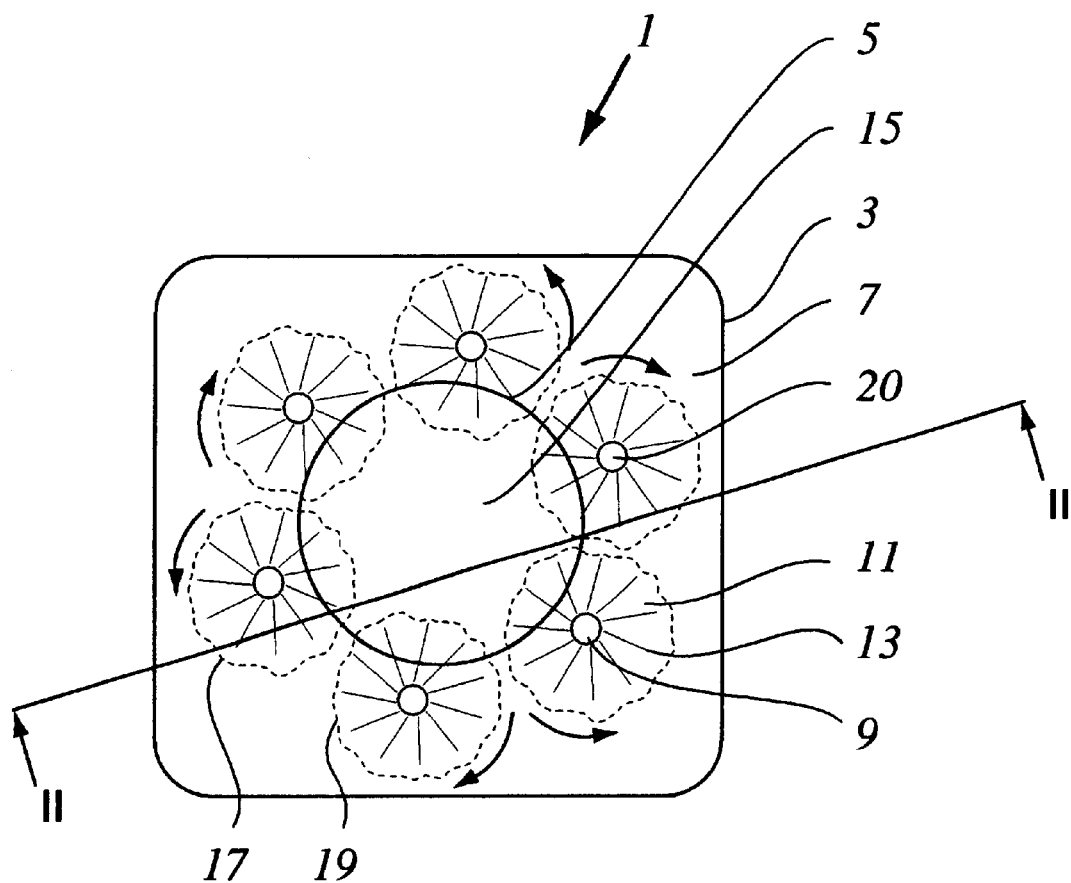
FIG. 1 is a view from above of one embodiment of a brush arrangement for a cleaning device according to the invention.

FIG. 1 shows a simplified view from above of a teat cleaning device 1 in which driving and supporting parts non-essential for the understanding of the invention have been omitted for the sake of clarity.

Teat cleaning device 1 comprises a box-like holder 3 with a teat receiving opening 5 in its upper surface 7. Holder 3 is intended to be placed under the udder of an animal to be milked with opening 5 below a teat which is to be cleaned. Holder 3 is then raised so that the teat enters the holder through opening 5. Holder 3 contains a plurality of cleaning means 9 shown here as elongated cylindrical brushes 11 with bristles 13. Holder 3 also contains cleaning fluid supplying means (not shown) and preferably drying air supplying means (not shown). Brushes 11 are each oriented with their longitudinal axis substantially perpendicular to the plane of upper surface 7 and are arranged in a circle with a central space 15 able to receive a teat. Brushes 11 are rotatably mounted on holder 3 and can be rotated by driving means (not shown) of any suitable type. There are preferably an even number of brushes 11 and each brush 11 rotates in the opposite direction to its neighboring brushes 11 as is shown by the arrows. Brushes 11 have preferably radially projecting bristles 13 attached by their proxial ends 19' to a central longitudinal shaft 20. For the sake of clarify of illustration the bristles are shown in the figures as individual bristles but they naturally can be formed by tufts or bunches of bristles. The distal ends 19" of bristles 13 define a cleaning surface 17.

Figure 2:
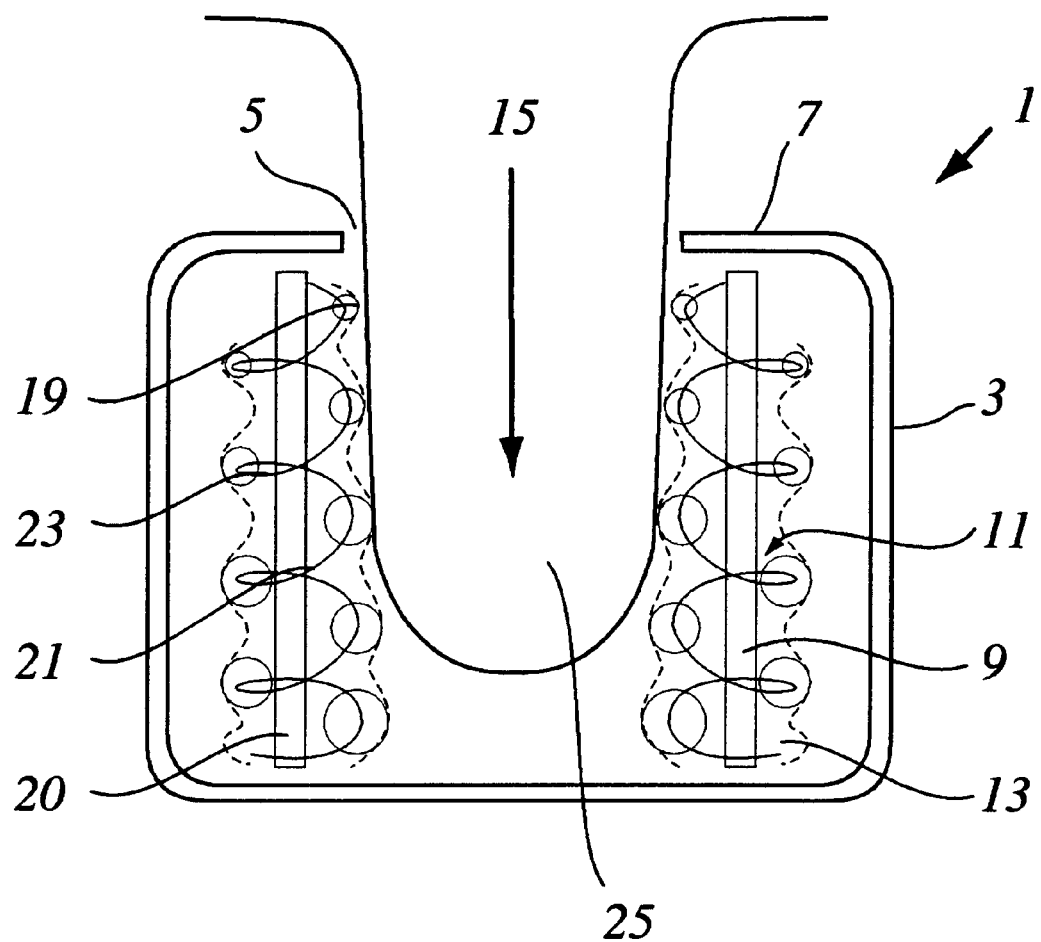
FIG. 2 is a cross-sectional view along line II—II of FIG. 1.

As can be seen in FIG. 2 bristles 13 are arranged in spiral patterns 21 on the brushes 11 so that the cleaning surface 17 has the shape of a screw thread. The thread 23 of the spiral pattern 21 on each brush is 11 adapted to the intended direction of rotation of the brushes 11 as shown by the arrow so that a teat 25 received in the central space 15 would tend to be drawn downwards by friction between the tips 19 of the bristles 13 of the rotating brushes 11 and the teat 25. The use of counter-rotating neighbouring brushes 11 prevents the teat 25 being drawn sideways out of the central space 15. Thus as the holder 3 is lifted vertically with a vertical speed v and the teat 25 to be cleaned 19 enters the holder 3 it comes into contact with the rotating brushes 11 and is drawn down into the holder by the spiral patterns 21 on the cleaning surfaces 17 at a rate which is greater that the vertical speed v of the holder 3. This causes the teat 25 to be stretched downwards and any folds of skin are stretched out and drawn smooth. This permits a more thorough cleaning of the teat surface. In a preferred embodiment of the invention the pitch of the spiral patterns 21 increases from the top to the bottom of the brushes 11 in order to ensure that the tip of the teat 25 is stretched.

Once the teat has been cleaned for a sufficient length of time the drive to the brushes can be stopped or reversed in order to facilitate the extraction of the teat 25 from the cleaning device 1.

Figure 3:
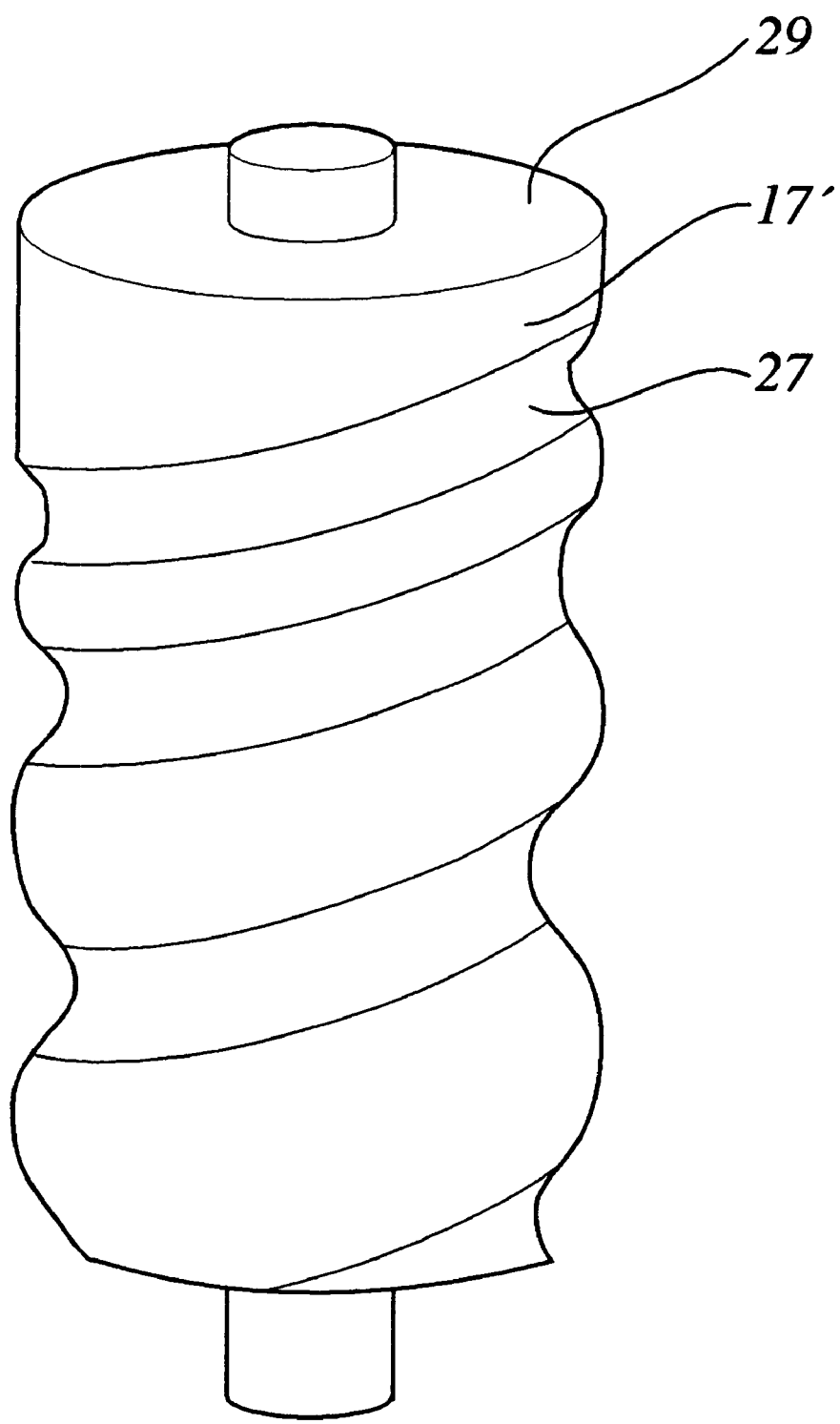
FIG. 3 is a schematic perspective view of a roller according to a second embodiment of the invention.

In a second embodiment of a cleaning device according to the invention shown in FIG. 3, the spiral pattern is formed by one or more spiral groove(s) 27 being formed in and on the cylindrical surface 17' of a cylindrical resilient rubber roller 29. Preferably the groove or grooves 27 have a progressivelly increasing pitch as they travel down the roller 29 in order to ensure that the teat is fully extended.

In another conceivable embodiment of the invention the longitudinal axis of the brushes are inclined a few degrees to the vertical, e.g. up to 10 or 15 degrees, so that the distance between the brushes at the top of the holder is greater than the distance between the brushes at the base of the holder in order to form an inverted cone shaped central opening. In this way the tip of the teat is gripped more tightly the further it penetrates into the holder.

In a further conceivable embodiment of the invention the cleaning means has a substantially conical shape with a spiral pattern formed in its cleaning surface.

In yet a further conceivable embodiment of the invention some of the cleaning means are driven while the remainder are not driven.

While the invention has been illustrated with brushes made of bristles and rollers made of rubber, any type of cleaning means, for example brushes with loops or U-shaped strands of resilient thread, grooved sponges, textile rollers or their equivalents, may conceivably be used instead of brushes made of bristles and rollers made of rubber and combinations of different types of cleaning means are also possible. Thus it is, for example, conceivable to use a holder containing a mixture of bristle brushes and rubber rollers, or indeed to have composite rollers comprising, for example a sponge portion and a bristle portion.

It is also conceivable that the cleaning means are adjustably mounted into the holder in order to permit the distance between the cleaning means to be varied to accommodate teats of different size.

What is claimed is:

1. Teat cleaning device (1) for cleaning teats (25) of an animal, said device being movable vertically for introduction of a teat therein, wherein said device (1) comprises a plurality of circumferentially separated teat cleaning means (9, 29), each of said cleaning means (9, 29) being rotatable about its respective longitudinal axis, said axis being oriented substantially vertically, said cleaning means (9, 29) having a helically shaped peripheral cleaning surface (17, 17'), and the direction of rotation of each cleaning means (9, 29) being chosen with respect to the direction of the helix of each cleaning means (9, 29) in such a way that the teat is dragged downwards when it is introduced into the device.

2. Teat cleaning device according to claim 1, characterised in that it comprises an even number of cleaning means (9, 29) and that adjacent cleaning means (9, 29) are rotatable in opposite directions.

3. Teat cleaning device according to claim 1, characterized in that said helical cleaning surface (17, 17') comprises a helix having a varying pitch.

4. Teat cleaning device according to claim 3, characterised in that said helical cleaning surface (17, 17') comprises a helix having a pitch which increases from top to bottom of said cleaning means (9, 29).

5. Teat cleaning device according to claim 1, characterized in that said cleaning surface (17, 17') is resilient.

6. Teat cleaning device according to claim 1, characterized in that said cleaning surface (17) comprises distal ends (19) of bristles (13) projecting from a central shaft (20).

7. Teat cleaning device according to claim 1, characterized in that said cleaning means (29) comprises an essentially cylindrically shaped body (29) and wherein said helical cleaning surface (17') comprises one or more helical grooves (27) formed in or on said body (29).

8. Teat cleaning device according to claim 1, characterized in that said cleaning means (29) comprises an essentially cylindrically shaped body (29) and wherein said helical cleaning surface (17') comprises one or more helical grooves (27) formed in or on said body (29).

9. Teat cleaning device according to claim 1, characterised in that said longitudinal axis is inclined up to 15° to the vertical.

* * * * *